3,110,685
SEMICONDUCTIVE MATERIALS CONTAINING THALLIUM
Georges R. Offergeld, Brussels, Belgium, assignor to Union Carbide Corporation, a corporation of New York
No Drawing. Filed June 12, 1961, Ser. No. 116,266
9 Claims. (Cl. 252—512)

The present invention relates to novel semiconductive materials and a process for producing the same.

The novel materials of this invention can be conveniently characterized by the general formula:

$$TlbX_2$$

wherein Tl represents thallium; $b$ is an element selected from the group consisting of indium and gallium; and X is an element selected from the group consisting of sulfur, selenium, and tellurium. The materials defined by this formula are:

| | |
|---|---|
| $TlInS_2$ | $TlGaS_2$ |
| $TlInSe_2$ | $TlGaSe_2$ |
| $TlInTe_2$ | $TlGaTe_2$ |

The inventive materials may be modified by the addition of certain doping elements, such as silicon, tellurium, tin, lead, arsenic, antimony, bismuth, iodine, copper, silver, gold, zinc, cadmium, and mercury. The amount of doping material added should be less than about one atom percent, and is preferably less than about 0.01 atom percent. Also, the novel materials may be combined with each other or with other semiconductive materials.

The inventive compositions are generally characterized as semiconductive, each of the compositions having good photoconductive properties and/or good thermoelectric power. For example, a resistance in the dark/resistance in the light ratio as high as 100, and a thermoelectric power as high as 500 $\mu v./°$ C. have been measured for undoped $TlGaTe_2$. The melting points of the six compositions all fall within the range of about 730 to 860° C.

The novel semiconductive materials can be prepared by melting together in a closed reaction vessel the constituents of the desired material in amounts proportioned to correspond to the aforedescribed formula $TlbX_2$, i.e., 25 atom percent thallium, 25 atom percent of an element selected from the group consisting of indium and gallium, and 50 atom percent of an element selected from the group consisting of sulfur, selenium, and tellurium. The starting materials should be of the highest possible purity and may be in elemental form or in the form of binary compositions such as $Tl_2S$, $Tl_2Se$, $Tl_2Te$, $In_2S_3$, $In_2Se_3$, $In_2Te_3$, $Ga_2S_3$, $Ga_2Se_3$, or $Ga_2Te_3$. Similarly, any of the aforedescribed doping elements may be added to the starting material either in elemental form or in combination with any of the other doping elements.

It is preferred to increase the temperature of the reaction vessel gradually so as to avoid abrupt temperature changes. The exact temperature required depends on the material to be formed and must be at least as high as the melting point of the material to be formed (see examples below). The reaction vessel is maintained at the melting temperature for at least one hour and is preferably slightly shaken during that period. It is preferred to carry out the melting in an evacuated vessel, e.g., at a pressure of about $10^{-4}$ mm. of mercury. The final melt may be cooled down to room temperature at any desired rate.

*Example I*

In an example of the inventive process, a bar of about 50 grams of $TlInTe_2$ was prepared by melting together 17.7906 grams (25 atom percent) of thallium, 22.2150 grams (50 atom percent) of tellurium and 9.9942 grams (25 atom percent) of indium in a quartz ampulla (diameter of about 15 mm. and length of about 250 mm.) which was evacuated to a pressure of about $10^{-4}$ mm. of mercury and sealed. The starting materials were commercially pure. The temperature of the ampulla was gradually raised (in about two hours) to about 800° C. and maintained at that temperature for one hour while being slightly shaken. The temperature was then decreased to room temperature at a rate of about 250° C. per hour. The resulting ingot was a rather compact gray-black bar of general metallic appearance having a melting point between 730 and 750° C., a resistivity both in the dark and in the light of about 6 ohms per cm., and a thermoelectric power of about $+240$ $\mu v./°$ C.

From a zone-melted sample of the $TlInTe_2$, monocrystalline samples were isolated which were characterized at room temperature by a resistivity in the dark of about 2000 ohms per cm. and a resistivity in the light of about 300 ohms per cm. (ratio of 6.67). When the monocrystalline samples were cooled to $-80°$ C., the resistivity in the dark increased to about 30,000 ohms per cm. while the resistivity in the light remained at about 300 ohms per cm. (ratio of 100). The useful spectral sensitivity extended from about 1 to 3 microns, thus including the near infra-red region. The time response was about 0.1 millisecond and was not temperature dependent.

*Example II*

Orange-yellow leaflets of $TlInSe_2$ were prepared by a process similar to that described in Example I. The leaflets had a melting point of about 730° C., a resistivity in the dark at room temperature of $6 \times 10^9$ ohms per cm., and a resistivity in the light at room temperature of $2 \times 10^9$ ohms per cm. (ratio of 3).

*Example III*

Yellow crystals of $TlGaS_2$ were prepared by a process similar to that described in Example I. The crystals had a melting point of about 860° C., a resistivity in the dark of $3 \times 10^7$ ohms per cm., and a resistivity in the light of $10^7$ ohms per cm. (ratio of 3).

*Example IV*

Gray-black crystals of $TlInSe_2$ were prepared by a process similar to that described in Example I. The crystals had a melting point between about 730 and 740° C., a resistivity in the dark of $4 \times 10^4$ ohms per cm., and a resistvity in the light of $2 \times 10^4$ ohms per cm. (ratio of 2).

*Example V*

Orange-yellow crystals of $TlGaSe_2$ were prepared by a process similar to that described in Example I. The crystals had a melting point of 785° C., a resistivity in the dark of $6 \times 10^6$ ohms per cm., and a resistivity in the light of $3 \times 10^5$ ohms per cm. (ratio of 20).

*Example VI*

Well-oriented black crystals of $TlGaTe_2$ of general metallic appearance were prepared by a process similar to that described in Example I. The crystals had a melting point between about 735 and 755° C., a resistivity both in the dark and in the light of about 6 ohms per cm., and a thermoelectric power of about $+500$ $\mu v./°$ C.

It can be seen from the above data that two of the novel semiconductive materials, the tellurides, have relatively good thermoelectric power and, therefore, are useful in thermoelectric devices such as thermoelectric generators and freezers. $TlGaTe_2$ and the other four materials, the sulfides and selenides, have electrical resistances which vary as the materials are in the dark or irradiated with light and, therefore, can be used as the photosensitive elements in devices wherein variations in radiant energy are detected, such as photocells. TlGaTe$_2$, with a resistance in the dark/resistance in the light ratio as high as 100, is especially useful in such devices. As mentioned above, the properties of any of the ternary compositions of the invention can be varied by the addition of various doping materials.

What is claimed is:

1. A process for producing a semiconductive material comprising melting together a mixture consisting essentially of 25 atom percent thallium, 25 atom percent of an element selected from the group consisting of indium and gallium, and 50 atom percent of an element selected from the group consisting of sulfur, selenium, and tellurium.

2. The process of claim 1 wherein said mixture is melted together under a pressure of about $10^{-4}$ mm. of mercury.

3. Semiconductive fused compositions of matter consisting essentially of 25 atom percent thallium, 25 atom percent of an element selected from the group consisting of indium and gallium, and 50 atom percent of an element selected from the group consisting of sulfur, selenium, and tellurium.

4. A semiconductive fused composition of matter consisting essentially of 25 atom percent thallium, 25 atom percent indium, and 50 atom percent sulfur.

5. A semiconductive fused composition of matter consisting essentially of 25 atom percent thallium, 25 atom percent indium, and 50 atom percent selenium.

6. A semiconductive fused composition of matter consisting essentially of 25 atom percent thallium, 25 atom percent indium, and 50 atom percent tellurium.

7. A semiconductive fused composition of matter consisting essentially of 25 atom percent thallium, 25 atom percent gallium, and 50 atom percent sulfur.

8. A semiconductive fused composition of matter consisting essentially of 25 atom percent thallium, 25 atom percent gallium, and 50 atom percent selenium.

9. A semiconductive fused composition of matter consisting essentially of 25 atom percent thallium, 25 atom percent gallium, and 50 atom percent tellurium.

References Cited in the file of this patent

UNITED STATES PATENTS

| 2,893,831 | Bither | July 7, 1959 |
| 3,023,079 | Kulifay | Feb. 27, 1962 |

FOREIGN PATENTS

| 1,238,964 | France | July 11, 1960 |